United States Patent
Szybiak et al.

(10) Patent No.: US 7,002,637 B2
(45) Date of Patent: Feb. 21, 2006

(54) SYSTEM AND METHOD FOR DETECTING PICTURE FREEZE WITHIN A VIDEO SIGNAL

(75) Inventors: Semko Szybiak, Scarborough (CA); Romolo Magarelli, Woodbridge (CA)

(73) Assignee: Evertz Microsystems Ltd., Burlington (CA)

( * ) Notice: Subject to any disclaimer, the term of this patent is extended or adjusted under 35 U.S.C. 154(b) by 293 days.

(21) Appl. No.: 10/097,399

(22) Filed: Mar. 14, 2002

(65) Prior Publication Data

US 2002/0196373 A1    Dec. 26, 2002

Related U.S. Application Data

(60) Provisional application No. 60/276,347, filed on Mar. 16, 2001.

(51) Int. Cl.
*H04N 5/14* (2006.01)
(52) U.S. Cl. .................. 348/700; 348/180; 348/722
(58) Field of Classification Search .......... 348/180, 348/184, 700, 699, 722; 382/170, 181, 224
See application file for complete search history.

(56) References Cited

U.S. PATENT DOCUMENTS

| | | | | |
|---|---|---|---|---|
| 5,488,430 A | * | 1/1996 | Hong | 348/699 |
| 5,612,752 A | * | 3/1997 | Wischermann | 348/701 |
| 6,055,018 A | * | 4/2000 | Swan | 348/448 |
| 6,259,480 B1 | * | 7/2001 | Yamauchi et al. | 348/452 |
| 6,633,329 B1 | * | 10/2003 | Janko et al. | 348/180 |
| 6,738,099 B1 | * | 5/2004 | Osberger | 348/699 |

* cited by examiner

*Primary Examiner*—Victor R. Kostak
(74) *Attorney, Agent, or Firm*—Hodgson Russ LLP

(57) ABSTRACT

A system for detecting picture freeze within a video signal wherein a video signal processing portion for connection to a video signal source comprising digital video luma samples and digital video clock and timing signals separately detects motion across the vertical axis of the video picture and across the horizontal axis of the video picture and wherein a frozen picture indicating portion connected to the output of the video signal processing portion determines the number of motionless video picture frames occurring since the last video picture frame in which motion was detected to indicate picture freeze when the number of motionless video picture frames reaches a predetermined value. A noise reduction threshold signal is applied to the video signal processing portion to distinguish motion from background noise in a video signal.

17 Claims, 3 Drawing Sheets

SYSTEM AND METHOD FOR DETECTING PICTURE FREEZE WITHIN A VIDEO SIGNAL

CROSS REFERENCE TO A RELATED APPLICATION

Applicants claim priority based on Provisional Application No. 60/276,347 filed Mar. 16, 2001 and entitled "Method And Circuit For Detecting Picture Freeze Within A Video Signal" which is incorporated herein by reference.

BACKGROUND OF THE INVENTION

This invention relates to video signal analysis, and more particularly to a new and improved system and method for detecting picture freeze within a video signal.

Modern, multi-stream broadcast facilities have need for monitoring multiple and diverse equipment failures, including link failure modes, and for providing an effective alarm to indicate such failures. Of particular interest is providing a user alarm in response to detection of transmission and/or processing equipment failure or any other malfunction leading to video signal freeze.

Prior art approaches to the foregoing problem are deficient in several respects. Prior methods have looked for motion within the active picture in contrast to the method utilized by the present invention. Prior solutions in most, if not all, cases required field or frame store solutions which, in turn, require more hardware and therefore add considerable cost. Also, prior art solutions have not addressed the noise factor.

SUMMARY OF THE INVENTION

It is, therefore, a primary object of the present invention to provide a new and improved digital video analyzer that can detect a picture freeze in the video signal.

It is another object of the present invention to provide a filter system that can distinguish between a video signal with frozen picture and a video signal with a short sequence of motionless action.

It is a further object of the present invention to provide a filter system that can distinguish between a video signal with time varying noise added on top of a frozen picture and a video signal with minute amounts of motion.

Broadly, the present invention relates to a system and method for detecting significant motions within a video signal by applying the following steps:

1. Comparing sums of luma samples in a certain number of relevant and matching horizontal lines between two frames of video.

2. Comparing sums of luma samples in a certain number of relevant and matching vertical lines between two frames of video.

3. Filtering the foregoing comparison results to reject short sequences of motionless video.

The foregoing algorithm relies on the observation that a picture with motion is characterized by either or all of: scene change, lighting change, or an object movement in horizontal or vertical or both dimensions. In all cases, even with the smallest moving object that is representable in the video signal, at least one of the sums of luma samples across vertical or horizontal lines will change from one frame to the next.

Preferably, the foregoing method restricts comparisons to frames with matching color frame sequence numbers, in order to minimize effect of imperfect luma separation in any video decoder feeding the present invention.

The foregoing and additional advantages and characterizing features of the present invention will become clearly apparent upon a reading of the ensuing detailed description together with the included drawings.

The following detailed description of the invention, when read in conjunction with the accompanying drawing, is in such full, clear, concise and exact terms as to enable any person skilled in the art to which it pertains, or with which it is most nearly connected, to make and use the invention.

BRIEF DESCRIPTION OF THE DRAWINGS FIGURES

DETAILED DESCRIPTION OF THE ILLUSTRATED EMBODIMENT

Figure 1:
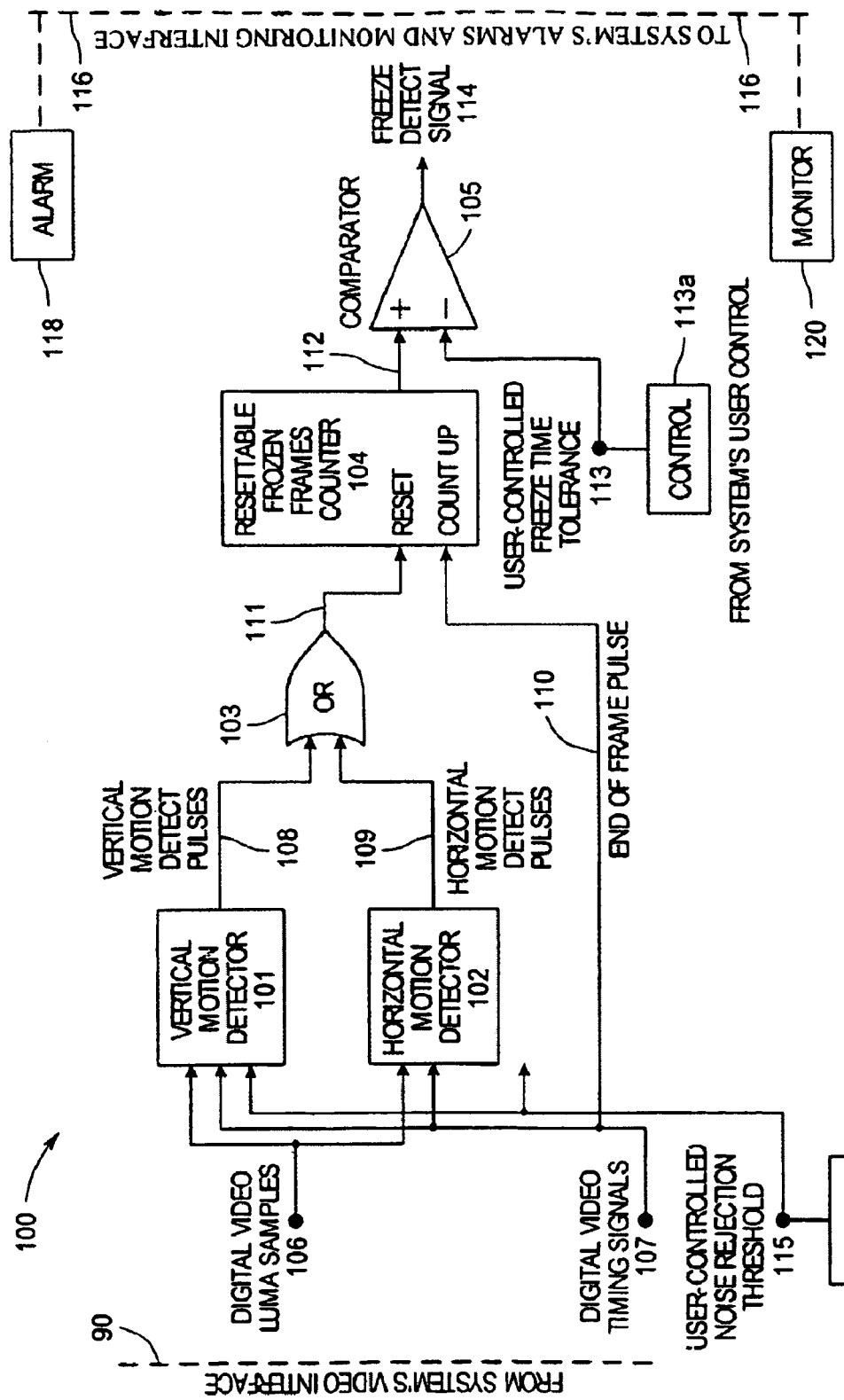
FIG. 1 is a top level block diagram illustrating the system and method of the present invention.

FIG. 1 shows the overall organization of the video picture freeze detection system and method of the present invention. Picture freeze has been defined as no activity above a preset noise level in an active picture. A related condition, picture black, has been defined as no active picture above 7 IRE. A video interface 90 provides inputs to the system 100 in the form of digital video luma samples on line 106 and digital video clock and timing signals on line 107. The digital video luma samples are obtained from a luminance decoder in a manner well understood by those skilled in the art. By the term "luma" is meant the standard definition of "luma" meaning black/white as commonly understood by video engineers. During time segments of the video signal when no luma samples are available, null (zero) samples are applied to the input 106. The necessary timing signals are easily derived in a manner well known to those skilled in the art. In particular, the digital video timing signals 107 represent a standard derivation of timing signals from an input video source as commonly understood by video engineers. By way of example, in the illustrative system shown in FIG. 1, signal 106 is a 10 bit signal and signal 107 is a 5 bit signal.

The system separately detects motion across the vertical axis of the picture using Vertical Motion Detector, 101 (described in detail later on), and across the horizontal axis of the picture using Horizontal Motion Detector, 102 (also described in detail later on). The luma samples and the timing signals are fed to both detectors simultaneously. Any detection of motion will trigger a pulse at the outputs of the corresponding detector. Both outputs are logically OR'ed in gate 103 and the result is used to reset a counter 104. The resettable frozen frames counter 104 is a standard, commercially available component having a non-proprietary code for counter functionality. The counter 104 counts up with every end of frame pulse 110 which is one pulse at the end of each picture frame. At any time, its output, 112, reflects the number of motionless frames since the last motion detection. When output 112 reaches a user defined number represented by the signal on line 113, the comparator 105 will assert its output, 114, to indicate or signal a frozen picture condition. The user-controlled freeze time tolerance signal on line 113 is obtained externally from the system user's control designated 113a in FIG. 1, whereby the user provides an input to set a level for identifying a frozen picture state. The setting is required because some video content could appear to be frozen but in reality is not. The unit of measure is number of video frames, a term commonly understood by video engineers. The control 113a sets duration, in frames, of video activity under the picture noise level that is considered a fault. The fault definition for picture freeze duration is 6 to 902 frames (in 4 frame increments), 302 frames being a typical setting. By way of example, in the illustrative system of FIG. 1, signal 113 is an 11 bit signal. The output signal on line 114 is utilized to activate an alarm or to provide the appropriate visual indication on a monitor. For example, signal 114 is coupled by an interface 116 to an alarm 118 or a monitor 120. The user-controlled noise rejection threshold signal on line 115, obtained externally from the system user's control designated 115a, which will be described in further detail presently, distinguishes motion from background noise. By way of example, in the illustrative system of FIG. 1, signal 115 is a 20 bit signal.

Figure 2:
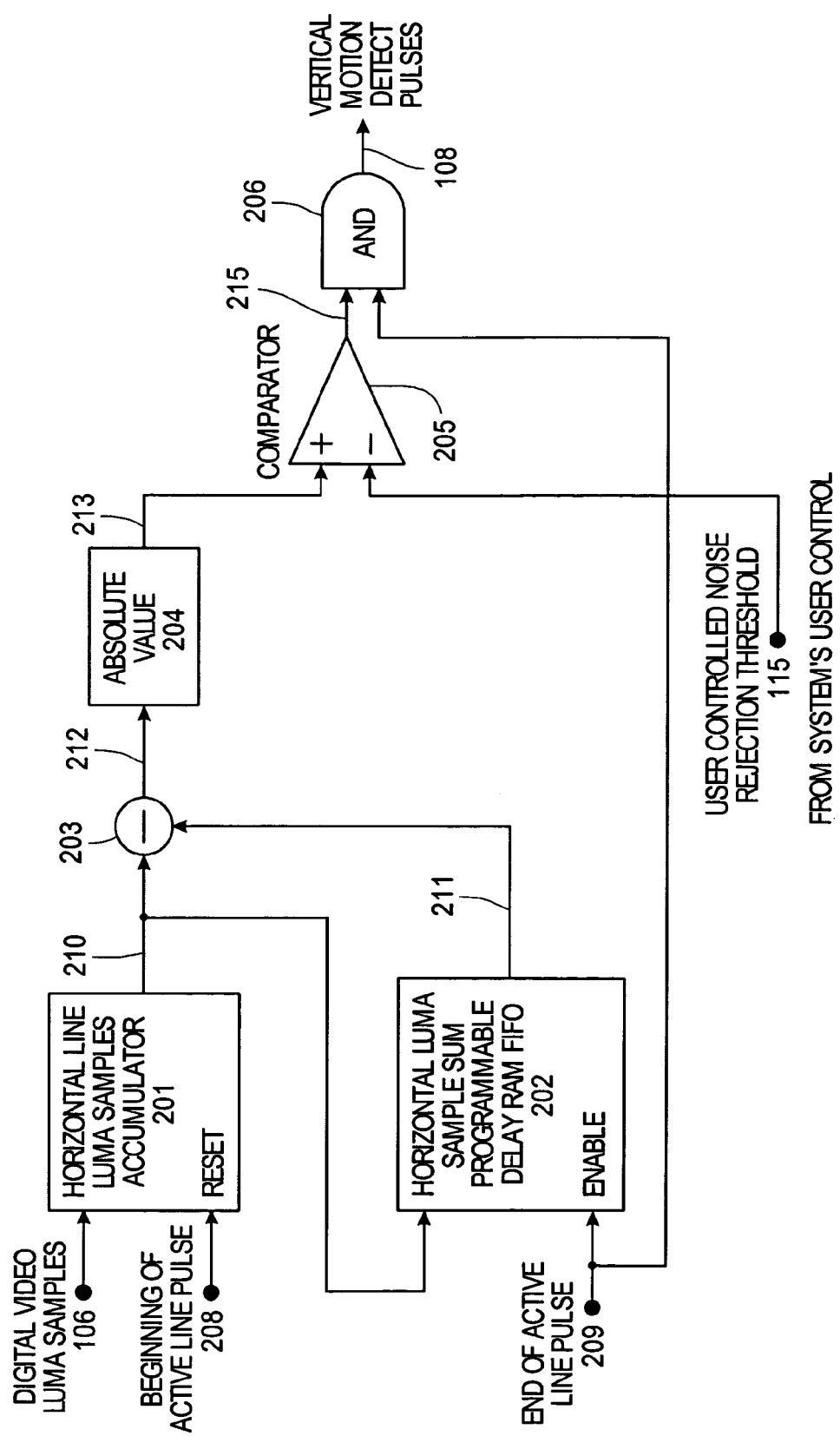
FIG. 2 is a schematic block diagram of the vertical motion detector in the arrangement of FIG. 1.

FIG. 2 illustrates the vertical motion detector 101 in further detail. Before the beginning of every active line, the accumulator, 201, is reset by a beginning of active line pulse 208. Pulse 208 consists of one pulse directly preceding the first luma sample of any active line as commonly understood by video engineers. Subsequently, all the luma samples, 106, from one video line are then accumulated in 201 producing horizontal luma sums. In particular, in the horizontal line luma samples accumulator 201, an active line pulse 208 precedes an active line of video and this resets the accumulator 201. Video luma samples 106 from the new line are inputted to the accumulator 201. Luma samples from this line are added and the value is stored in a memory buffer for the line. The next line active pulse 208 sets the accumulator 201 to repeat luma sample accumulation from the next line. The value is stored in the memory buffer for that line. The process continues for the remaining active lines for the digital video luma samples, i.e. for the number of lines programmed into RAM 202. Upon completion the accumulator 201 resets, and the accumulated line luma values are stored in respective line luma memory buffers. The accumulator 201 repeats every 8 fields or 4 frames at a minimum.

At the completion of the active line, the accumulated output, 210, of the accumulator 201, is subtracted in component 203 from the similarly derived value stored N frames (where N is a programmable integer number, typically N=4) earlier in RAM 202. In particular, horizontal luma sample sum programmable delay RAM FIFO 202 is a standard component which stores luma samples horizontally along an active line in a field of video. The difference, 212, is then processed in 204 to obtain its absolute value, 213, which is then compared in 205 against a user-controlled noise threshold, 115. The user-controlled noise threshold signal on line 115 is obtained externally from the system user's control to set the approximate level of noise expected in the video signal feed. It is used by the freeze detect feature of the present invention to distinguish motion from background noise on top of a video feed. By way of comparison, a signal to noise ratio of 1 corresponds to digital freeze, i.e. no noise on top of a frozen picture, as compared to a 40 dB signal to noise ratio of 10. The fault definition for picture noise level includes 1 to 10 with 9 being preferred. Noise can give the impression that the video is non-frozen even though the content is truly frozen. The setting of the threshold on line 115 rejects or filters the noise to create a "clean" signal for freeze determination.

Component 204 is a signal processor block (software code within a field programmable gate array) that performs the arithmetic function of absolute value on the input data. Component 204 is a standard block that takes an unsigned value and generates a signed value. In particular, at component 203 two unsigned values are subtracted resulting in the unsigned value 212 which is the input to component 204. The output 213 has been converted to a signed value by component 204. The output, 215, of the comparison performed in component 205 is useful only at the end of the active line and thus is gated in 206 with timing signals 209 to create the vertical motion detect pulses, 108 shown in FIG. 1. Timing signal 209 is an end of active line pulse which consists of one pulse following the last luma sample of any active line as commonly understood by video engineers. Simultaneously, at the end of the active line, signal 209 saves the computed horizontal luma sum, 210, in RAM 202 which effectively acts as a delay FIFO with time delay set to 4 frames. By way of example, in the illustrative system of FIG. 1, output 210 of accumulator 201 is a 20 bit signal, input 212 to component 204 is a 21 bit signal and output 213 of component 204 is a 20 bit signal.

Figure 3:
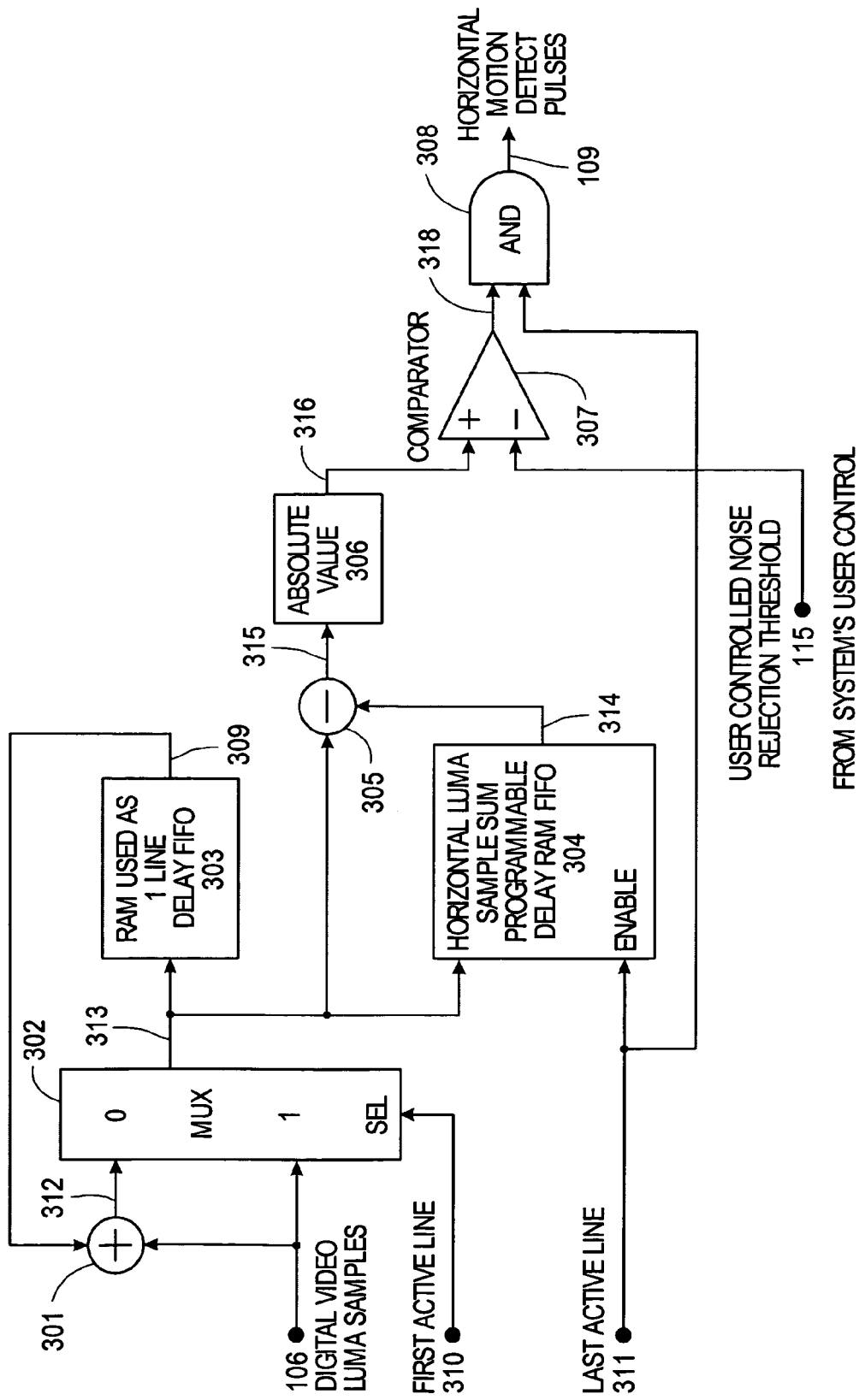
FIG. 3 is a schematic block diagram of the horizontal motion detector in the arrangement of FIG. 1.

The horizontal motion detector 102 is shown in further detail in FIG. 3 During the first active line of any picture frame, an input signal named first-active-line 310, which is asserted during the first active line of the picture frame, causes the multiplexer 302 to shift entire line-worth of luma samples into the line delay FIFO 303. The ram used as 1 line delay FIFO 303 is a standard component which uses the same position luma sample over vertical lines in a field of video. During subsequent lines, each new luma sample on input 106 is added in 301 to the output, 309, of the memory cell in line delay FIFO 303. Thus all luma samples from one vertical line will be accumulated into one memory cell of 303 to produce vertical luma sample sums. During the last active line of picture frame, the output of mux 302 contains new vertical luma sums, 313. Simultaneously, another RAM FIFO, 304, presents on its output similarly derived vertical luma sample sums, 314, stored N frames earlier (where N is a programmable integer number, typically N=4). The vertical luma sample sum programmable delay RAM FIFO 304 is a standard component which stores luma samples vertically across the same sample on different lines in a field of video. Both the new, 313, and the old, 314, sums are subtracted from each other in 305 to produce the difference, 315. It is processed in 306 to obtain its absolute value, 316, which is then compared in 307 against the user-controlled noise threshold, 115, which is the same as threshold 115 in FIG. 2. Component 306 is a signal processor block (software code within a field programmable gate array) that performs the arithmetic function of mathematical absolute value on the input data and is similar to component 204 of FIG. 2. At component 305 two unsigned values are subtracted resulting in the unsigned value 315 which is input to component 306. The output 316 has been converted to a signed value by component 306. The output, 318, of the comparison is useful only during the last active line and thus is gated in 308 with timing signal 311, which is asserted during the last active line of the picture frame, to create horizontal motion detect pulses, 109 shown in FIG. 1. Simultaneously, during the last active line, signal 311 saves the computed vertical luma sums, 313, in 304 which effectively acts as a delay FIFO with time delay set to 4 frames.

When the picture noise level is increased via control 115a, it is preferred that the picture freeze duration be increased via control 113a as well. This is because the higher the picture noise level, the lower is equipment's motion sensitivity, thus long periods without significant on-screen movement are more likely to trigger a "false" freeze alarm. Setting up the optimum picture noise level and picture freeze duration parameters will depend on the amount of noise in the video path from the equipment with freeze-frame capability to the monitoring point. The maximum amount of time permissible between the moment of freeze and the alarm should be determined. Setting this time as high as tolerable has two benefits. It lowers the frequency of "false" freeze alarms generated when a perfectly valid content contains long motionless periods. It allows raising the picture noise level parameter, without increasing frequency of "false" freeze alarms.

Preferably, the picture noise level should be set after setting the picture freeze duration. If the video path is fully digital, then the picture noise level can be set depending on bit-error rate of the link as follows. For bit-error rates less than 1 in $10^{E-12}$, the value should be set in the range of 1 to 5. For bit-error rates greater than 1 in $10^{E-12}$, the value should be set in the range of 6 to 10. If the path is even partially analog and if the equipment can be placed farthest upstream in the video path to go to a "freeze frame" mode, then the picture noise level should be optimized by initiating the "freeze frame" mode in the upstream equipment and adjusting picture noise level as low as possible, without losing the freeze alarm. It should be noted that because of the random nature of noise, the freeze alarm might be intermittent at some picture noise level settings. The optimal picture noise level setting is obtained when the loss of freeze alarm occurs no more than once every 5 minutes.

If the path is even partially analog and the equipment farthest upstream in the video path cannot go to a "freeze frame" mode, then picture noise level should be optimized by adjusting it as high as possible. If one triggers false freeze alarms more often than acceptable, the picture noise level setting should be lowered.

The picture noise level and picture freeze duration controls 115a and 113a, respectively are able to detect short-term "digital" freezes such as MPEG or motion JPEG server artifacts. When devices have a significant problem with the content that they are de-compressing, they will typically start to produce a "blocky" effect. If the problem is severe enough, they will freeze a frame of video and play it out for a number of frames. With the picture noise level set to 1 (i.e. only detect exact, or nearly exact pictures) and the picture freeze duration set to minimum, the system can detect these quick "digital freezes".

Advantageously, picture changes due to lighting variation or outright scene change are detected equally effectively by both horizontal and vertical motion detectors and thus do not necessitate any extra hardware or software.

Thus, the present invention provides a signal processor, for use with any user control and status reporting interface, which has one video input signal and which determines whether the content of the video data is non-moving, even in presence of time-varying noise in the video input. An algorithm is implemented in a manner that does not require video frame storage devices. The system of the present invention will utilize results from the signal processor to trigger in-video text alarms, external alarms, and/or interface to remote network based monitoring systems. The efficient algorithm of the present invention provides a low-cost implementation that can be utilized in a multi-stream, modern broadcast facility. This technology can be implemented in a variety of additional applications.

While an embodiment of the present invention has been described in detail, that is done for the purpose of illustration, not limitation.

What is claimed is:

1. A system for detecting picture freeze within a video signal comprising digital video luma samples, the system comprising:
   a) a horizontal motion detector having an input for connection to a video signal source to detect motion across the horizontal axis of the video picture during each frame thereof by comparing sums of luma samples in vertical lines between frames of video;
   b) a vertical motion detector having an input for connection to a video signal source to detect motion across the vertical axis of the video picture during each frame thereof by comparing sums of luma samples in horizontal lines between frames of video;
   c) component connected to the outputs of the horizontal and vertical motion detectors to determine the number of motionless picture frames occurring since the last picture frame in which motion was detected; and
   d) a comparator connected to the component to compare the output thereof to a predetermined value to indicate picture freeze when the output of the component reaches the predetermined value.

2. A system according to claim 1, further including an alarm operatively connected to the comparator to signal the indicated picture freeze.

3. A system according to claim 1, further including a monitor operatively connected to the comparator to display an indication of the picture freeze.

4. A system according to claim 1, further including means for applying a noise rejection threshold signal to the horizontal and vertical motion detectors to distinguish motion from background noise in a video signal.

5. A system according to claim 1, wherein the comparator is connected to a control which provides the predetermined value indicative of a level for identifying a frozen picture state.

6. A method for detecting picture freeze within a video signal comprising:
   a) comparing sums of luma samples in a predetermined number of horizontal lines between two frames of a video signal to detect motionless video;
   b) comparing sums of luma samples in a predetermined number of vertical lines between two frames of a video signal to detect motionless video; and
   c) filtering the results of comparing the sums to reject sequences of motionless video up to a predetermined length as established by a predetermined picture freeze duration parameter.

7. A method according to claim 6, further including utilizing the results of comparing the sums to indicate picture freeze within the video signal.

8. A method for detecting picture freeze within a video signal comprising digital video luma samples, the method comprising:
   a) detecting motion across the horizontal axis of a video picture in a video signal during each frame thereof by comparing sums of luma samples in vertical lines between frames of video;
   b) detecting motion across the vertical axis of the video picture in a video signal during each frame thereof by comparing sums of luma samples in horizontal lines between frames of video;

c) determining the number of motionless picture frames occurring since the last picture frame in which motion was detected; and d) comparing the determined number of motionless picture frames to a predetermined value to indicate picture freeze when the determined number reaches the predetermined value.

9. A system for detecting picture freeze within a video signal comprising:

a) a video signal processing portion for connection to a video signal source comprising digital video luma samples and digital video clock and timing signals to separately detect motion across the vertical axis of the video picture by comparing sums of luma samples in horizontal lines between frames of video and across the horizontal axis of the video picture by comparing sums of luma samples in vertical lines between frames of video; and b) a frozen picture indicating portion connected to the output of the video signal processing portion to determine the number of motionless video picture frames occurring since the last video picture frame in which motion was detected and to indicate picture freeze when the number of motionless video picture frames reaches a predetermined value.

10. A system according to claim 9, further including means for applying a noise reduction threshold signal to the video signal processing portion to distinguish motion from background noise in a video signal.

11. A system according to claim 9, wherein a control is connected to the frozen picture indicating portion to provide the predetermined value indicative of a level for identifying a frozen picture state.

12. A system for detecting picture freeze within a video signal comprising digital video luma samples and digital video timing signals including beginning of active line pulses and end of active line pulses, the system comprising;

a) a horizontal motion detector having an input for connection to a video signal source to detect motion across the horizontal axis of the video picture during each frame thereof;

b) a vertical motion detector having an input for connection to a video signal source to detect motion across the vertical axis of the video picture during each frame thereof;

c) a component connected to the outputs of the horizontal and vertical motion detectors to determine the number of motionless picture frames occurring since the last picture frame in which motion was detected;

d) a comparator connected to the component to compare the output thereof to a predetermined value to indicate picture freeze when the output of the component reaches the predetermined value; and e) the vertical motion detector comprising a horizontal line luma samples accumulator having an input to receive the digital video luma samples and being reset by the beginning of active line pulses, a horizontal luma sample sum programmable delay RAM FIFO having an input connected to the output of the accumulator and being enabled by the end of active line pulses, the RAM FIFO determining the number of luma samples stored in the accumulator, a component operatively coupled to the outputs of the accumulator and the RAM FIFO to obtain the absolute value of the difference between the outputs, a comparator connected to the component to compare the output thereof to the predetermined value to indicate when the output reaches the indicated value, and means for gating the output of the comparator with end of active line pulses to provide vertical motion detect pulses.

13. A system according to claim 12, wherein the comparator is connected to a control which provides the predetermined value to distinguish motion from background noise in the video signal.

14. A system for detecting picture freeze within a video signal comprising digital video luma samples and digital video timing signals including beginning of active line pulses and end of active line pulses, the system comprising:

a) a horizontal motion detector having an input for connection to a video signal source to detect motion across the horizontal axis of the video picture during each frame thereof;

b) a vertical motion detector having an input for connection to a video signal source to detect motion across the vertical axis of the video picture during each frame thereof;

c) a component connected to the outputs of the horizontal and vertical motion detectors to determine the number of motionless picture frames occurring since the last picture frame in which motion was detected;

d) a comparator connected to the component to compare the output thereof to a predetermined value to indicate picture freeze when the output of the component reaches the predetermined value; and e) the horizontal motion detector comprising a multiplexer having an input to receive the digital video luma samples and being shifted by the first active line signals, a RAM used as a 1 line delay FIFO having an input connected to the output of the multiplexer, means for inputting to the multiplexer the sum of the output of the RAM and the digital video luma samples, a vertical luma sample sum programmable delay RAM FIPO having an input connected to the output of the multiplexer and being enabled by the last active line signals, a component operatively connected to the output of the multiplexer and the programmable delay RAM FIFO to obtain the absolute value of the difference between the outputs, a comparator connected to the component to compare the output thereof to a predetermined value to indicate when the output reaches the predetermined value, and means for gating the output of the comparator with the last line active signals to provide horizontal motion detect pulses.

15. A system according to claim 14, wherein the comparator is connected to a control which provides the predetermined value to distinguish motion from background noise in the video signal.

16. A method for detecting picture freeze within a video signal comprising:

a) detecting motion across the horizontal axis of a video picture in a video signal during each frame thereof;

b) detecting motion across the vertical axis of the video picture in a video signal during each frame thereof;

c) determining the number of motionless picture frames occurring since the last picture frame in which motion was detected;

d) comparing the determined number of motionless picture frames to a predetermined value to indicate picture freeze when the determined number reaches the predetermined value; and e) wherein detecting motion across the vertical axis of a video picture in a video signal during each frame thereof comprises accumulating all the digital video luma samples from one video line to produce horizontal luma sums, continuing the accumulating for a predetermined number of active lines, subtracting the value of the accumulated digital video luma samples from a similarly derived value stored N frames earlier where N is an integar to obtain a difference value, processing the difference value to obtain an absolute value, comparing absolute value to a noise threshold to distinguish motion from background noise on the video signal, and gating the result of the comparing with a timing signal at the end of an active line to provide an output signal indicative of vertical motion.

17. A method for detecting picture freeze within a video signal comprising:
   a) detecting motion across the horizontal axis of a video picture in a video signal during each frame thereof;
   b) detecting motion across the vertical axis of the video picture in a video signal during each frame thereof;
   c) determining the number of motionless picture frames occurring since the last picture frame in which motion was detected;
   d) comparing the determined number of motionless picture frames to a predetermined value to indicate picture freeze when the determined number reaches the predetermined value; and
   e) wherein detecting motion across the horizontal axis of a video picture in a video signal comprises accumulating luma samples from a vertical line to produce a vertical luma sample sum, subtracting the value of the vertical luma sample sum from a similarly derived vertical luma sample sum stored N frames earlier where N is an integer to obtain a difference value, processing the difference to obtain an absolute value, comparing, the absolute value to a noise threshold to distinguish motion from background noise on the video signal, and gating the result of the comparing with a last active line signal to provide an output signal indicative of horizontal motion.

* * * * *